United States Patent
Oouchi et al.

(10) Patent No.: US 6,955,714 B2
(45) Date of Patent: Oct. 18, 2005

(54) COLLECTING FACILITY OF HIGH MELTING POINT COMPONENT IN GAS AND COLLECTING FACILITY OF DIHALOGENATED AROMATIC COMPOUND IN GAS

(75) Inventors: Kenji Oouchi, Tokyo (JP); Kiwamu Ishii, Tokyo (JP); Jyunji Wakayama, Tokyo (JP); Tomio Ohno, Ichihara (JP)

(73) Assignees: Tsukishima Kikai Co., Ltd., Tokyo (JP); Idemitsu Kosan Co., Ltd., Tokyo (JP)

(*) Notice: Subject to any disclaimer, the term of this patent is extended or adjusted under 35 U.S.C. 154(b) by 83 days.

(21) Appl. No.: 10/638,025

(22) Filed: Aug. 8, 2003

(65) Prior Publication Data

US 2004/0097700 A1 May 20, 2004

(30) Foreign Application Priority Data

Aug. 9, 2002 (JP) .................................... 2002-233748

(51) Int. Cl.$^7$ ............................................. F25J 5/00
(52) U.S. Cl. .............................. 96/236; 96/242; 62/617
(58) Field of Search ........................ 96/234, 236, 242, 96/271; 95/205, 188, 189, 209, 233, 290; 62/601, 617, 637

(56) References Cited

U.S. PATENT DOCUMENTS

| | | | | | |
|---|---|---|---|---|---|
| 2,050,797 A | * | 8/1936 | Stapleton et al. | ............. | 96/242 |
| 3,852,050 A | * | 12/1974 | Hsiao et al. | .................. | 95/189 |
| 4,281,518 A | * | 8/1981 | Muller et al. | ................. | 62/632 |
| 4,696,683 A | * | 9/1987 | Vitovec et al. | ............... | 95/268 |
| 4,769,054 A | * | 9/1988 | Steigman | ..................... | 62/601 |
| 5,340,383 A | * | 8/1994 | Womack | ...................... | 95/243 |

* cited by examiner

Primary Examiner—Frank M. Lawrence
(74) Attorney, Agent, or Firm—Koda & Androlia

(57) ABSTRACT

A collecting facility for collecting a component of a high melting point in a gas that includes a collecting tower through which a gas flows, a treating liquid projecting apparatus projecting treating liquid having temperature not higher than the melting point of a high melting point component in the gas in the collecting tower, and an extracting device for extracting from the inside of the collecting tower a slurry composed of the treating liquid and the high melting point component solidified by contact with the treating liquid.

1 Claim, 3 Drawing Sheets

COLLECTING FACILITY OF HIGH MELTING POINT COMPONENT IN GAS AND COLLECTING FACILITY OF DIHALOGENATED AROMATIC COMPOUND IN GAS

BACKGROUND OF THE INVENTION

1. Field of the Invention

The present invention relates to a facility of collecting a component having higher melting point as compared with other constituent components in a gas. More particularly, the present invention relates to a facility suitable for collecting a di-halogenated aromatic compound in a gas discharged accompanying dehydration treatment, in production of a polyarylene sulfide resin (hereinafter, referred to simply as PAS).

2. Description of Prior Art

Conventionally, polyarylene sulfide resins such as a polyphenylene sulfide resin (hereinafter, referred to simply as PPS) are known as an engineering resin excellent in mechanical strength, heat resistance and the like and having high rigidity.

For producing this PAS, there are methods disclosed, for example, in Japanese Patent Application Publication (JP-B) No. 52-12240 (production method of p-phenylene sulfide polymer), and Japanese Patent Application Laid-Open (JP-A) Nos. 2-180928 (production method of polyarylene sulfide), 6-248077 (production method of polyarylene sulfide having high molecular weight), 7-207027 (production method of polyarylene sulfide), 7-228698 (production method of polyarylene sulfide) and the like.

These methods have an approximate process in which a di-halogenated aromatic compound such as polydichlorobenzene (PDCB) and the like and an alkali metal sulfide such as sodium sulfide, lithium sulfide and the like are subjected to a polymerization reaction in an aprotic organic solvent such as N-methyl-2-pyrrolidone (hereinafter, simply referred to as NMP). In producing PAS by these methods, when the water content of a reaction substance is controlled before the polymerization reaction or during the polymerization reaction, PAS having higher molecular weight can be produced, therefore, in general, dehydration treatment is conducted by a distillation tower and the like.

However, when production of PAS is conducted continuously by these methods, a component of higher melting point as compared with other constituent components such as a di-halogenated aromatic compound and the like mixes in a gas discharged from a distillation tower into which a reaction substance is fed continuously, and is discharged together. Therefore, when such a gas is cooled, there is a possibility that a di-halogenated aromatic compound and the like contained therein solidify and adhere to a discharge tube and the like to clog the tube.

Therefore, now, a di-halogenated aromatic compound C in a gas G is tried to be collected by a recovering apparatus 100 shown in FIG. 1, and the like.

Namely, in the collecting apparatus 100, by first opening only 101A of gate valves 101A and 101B, the gas G into which the di-halogenated aromatic compound C mixes is fed in a first condenser 103A through a feeding tube 102A. In this time, an atmosphere in the first condenser 103A is cooled to temperatures lower than the melting point of the di-halogenated aromatic compound C by a refrigerant IW such as cooling water and the like. Therefore, in the first condenser 103A, the di-halogenated aromatic compound C in the gas G solidifies, and the gas G discharged through a discharge tube 104A does not receive mixing with the di-halogenated aromatic compound C. After conducting the above-mentioned treatment for given time, then, the gate valve 101A is closed and the gate valve 101B is opened, and the gas G into which the di-halogenated aromatic compound C mixes is fed into a second condenser 103B through a feeding tube 102B (switching of this treatment does not need the lapse of time, and sometimes needs change of the temperature of the gas G discharged from the condenser 103A, change of the temperature of the refrigerant IW passed through the condenser 103A, change of the pressure of the gas G fed to the condenser 103A, and the like). In this time, an atmosphere in this second condenser 103B is cooled to temperatures lower than the melting point of the di-halogenated aromatic compound C by a refrigerant IW. Therefore, in the second condenser 103B, the di-halogenated aromatic compound C in the gas G solidifies, and the gas G discharged through a discharge tube 104B does not receive mixing with the di-halogenated aromatic compound C. On the other hand, during feeding of the gas G into this second condenser 103B, an atmosphere in the first condenser 103A is heated to temperatures higher than the melting point of the di-halogenated aromatic compound C by a heat medium HW such as hot water and the like. Therefore, the di-halogenated aromatic compound C solidified in the first condenser 103A is melted, and discharged from the bottom through a discharge tube 105A, and collected. After given time of the above-mentioned treatment, flow through of the gas G is switched to a feeding tube 102A, and the same operation as described above is repeated. Thus, the di-halogenated aromatic compound C in the gas G is collected.

Problems to be Solved by the Invention

However, in the case of the above-mentioned collecting facility, switching of the flow through route of the gas G is required, therefore, the operation is not continuous, leading to poor treating efficiency. During no passing through the gas G, the temperature of the gas G remaining in the feeding tube 102A or 102B lowers, and sometimes, the di-halogenated aromatic compound C solidifies and adheres, therefore, the feeding tubes 102A, 102B have to be hot-insulated. This not only causes loss of energy but also makes a complicated structure of the facility.

SUMMARY OF THE INVENTION

Then, a main object of the present invention is to provide a facility of collecting components of high melting point in a gas, showing excellent treating efficiency and having a relatively simple structure, and a facility of collecting a di-halogenated aromatic compound in a gas.

Means for Solving the Problems

The inventions solving the above-mentioned problems are as follows.

A facility of collecting a component having higher melting point as compared with other constituent components in a gas, comprising a collecting tower through which the gas passes, a treating liquid projecting means of projecting treating liquid having temperature controlled to not higher than the melting point of the high melting point component, to the gas in this collecting tower, and an extracting means of extracting from inside of the collecting tower a slurry composed of the treating liquid and the high melting point component solidified by contact with the treating liquid.

The collecting facility of a high melting point component in a gas according to claim 1, equipped with a separation tank in which the slurry extracted from inside of the collecting tower is stored and a melting means of melting the high melting point component solidified in the slurry, wherein the high melting point component is recovered utilizing a difference in specific gravity of the melted high melting point component and the treating liquid.

A facility of collecting a di-halogenated aromatic compound in a gas discharged accompanying dehydration treatment, in production of a polyarylene sulfide resin of polymerizing a di-halogenated aromatic compound and an alkali metal sulfide in an aprotic organic solvent, wherein the facility comprises a collecting tower, through which the gas passes, a treating liquid projecting means of projecting treating liquid having temperature controlled to not higher than the melting point of the di-halogenated aromatic compound, to the gas in this collecting tower, and an extracting means of extracting from inside of the collecting tower slurry composed of the treating liquid and the di-halogenated aromatic compound solidified by contact with the treating liquid.

MODE OF EMBODYING THE INVENTION

Figure 1:
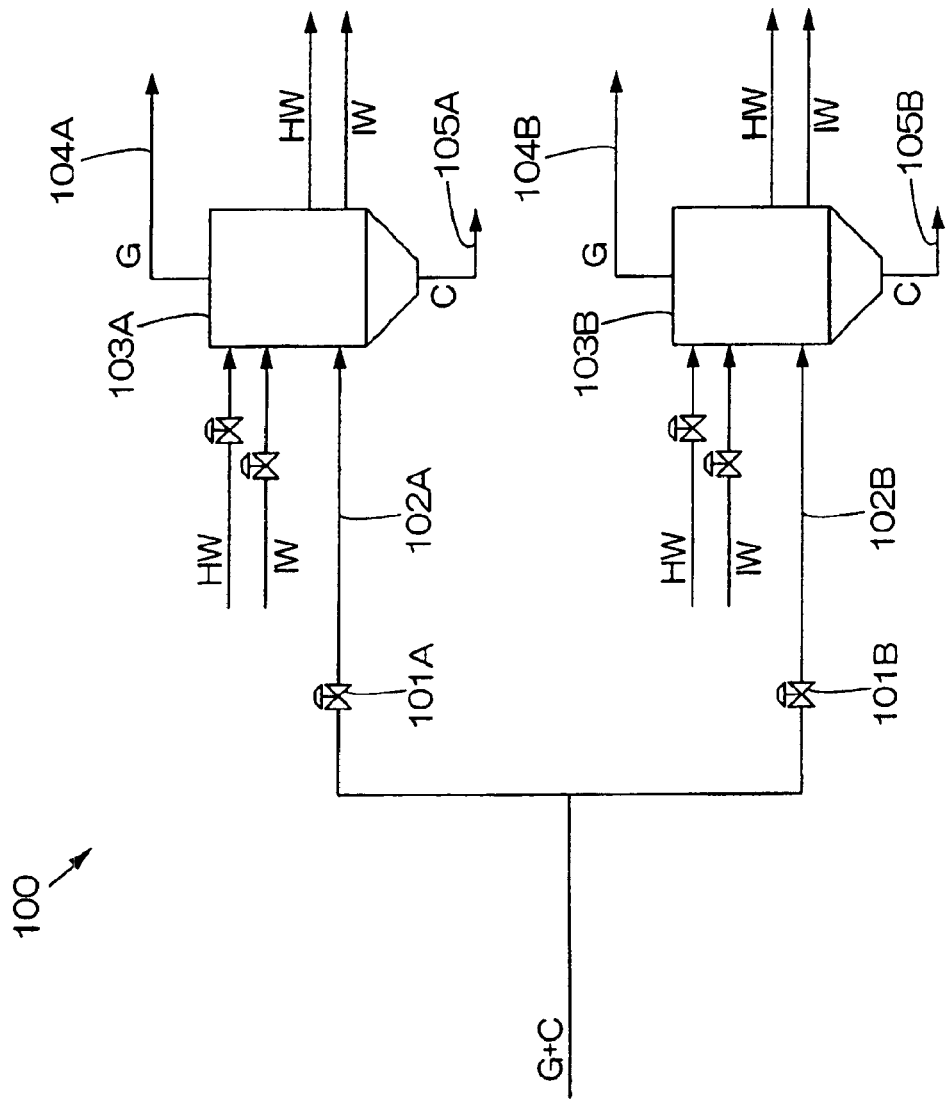
FIG. 1 is a constitution view of a conventional collecting facility.

The embodiments of the present invention will be illustrated.

<Resume of the Invention>

The present invention relates to a facility of collecting a component having higher melting point as compared with other constituent components in a gas, characterized in that it comprises a collecting tower through which the gas passes, a treating liquid projecting means of projecting treating liquid having temperature controlled to not higher than the melting point of the high melting point component, to the gas in this collecting tower, and an extracting means of extracting from inside of the collecting tower a slurry composed of the treating liquid and the high melting point component solidified by contact with the treating liquid. In the present invention, a collecting tower through which a gas passes is provided, and treating liquid projected to the gas in the collecting tower, to solidify a component of higher melting point, therefore, a slurry is formed of the treating liquid utilized for solidification and the solidified component of higher melting point. Consequently, simultaneously and concurrently with solidification of a component of higher melting point in a gas, the solidified component of higher melting point can be extracted (as a slurry) from inside of the collecting tower. In the present invention, since the extracting means for effecting such extraction is provided, a series of treatments are all conducted continuously. Namely, according to the collecting facility of the present invention, continuous treatment not needing switching of a flow through route of a gas is established, leading to extremely excellent treating efficiency.

The collecting facility of the present invention is more preferable when it is equipped with a separation tank in which the slurry extracted from inside of the collecting tower is stored and a melting means of melting the high melting point component solidified in the slurry, and the high melting point component is recovered utilizing a difference in specific gravity of the melted high melting point component and the treating liquid. By this constitution, recovering of a high melting point component is established simply and securely, and recycling of a high melting point component becomes possible.

Further, the collecting facility of the present invention is particularly preferable when it is a facility of collecting a component having higher melting point as compared with other constituent components, namely, a di-halogenated aromatic compound in a gas discharged accompanying dehydration treatment, in production of a, polyarylene sulfide resin of polymerizing a di-halogenated aromatic compound and an alkali metal sulfide in an aprotic organic solvent.

Hereinafter, examples of producing PAS such as PPS and the like will be first described below, and thereafter, a facility of recovering a di-halogenated aromatic compound contained in a gas discharged accompanying dehydration treatment, in production of PAS, will be illustrated.

<Method of producing PAS>

Figure 2:
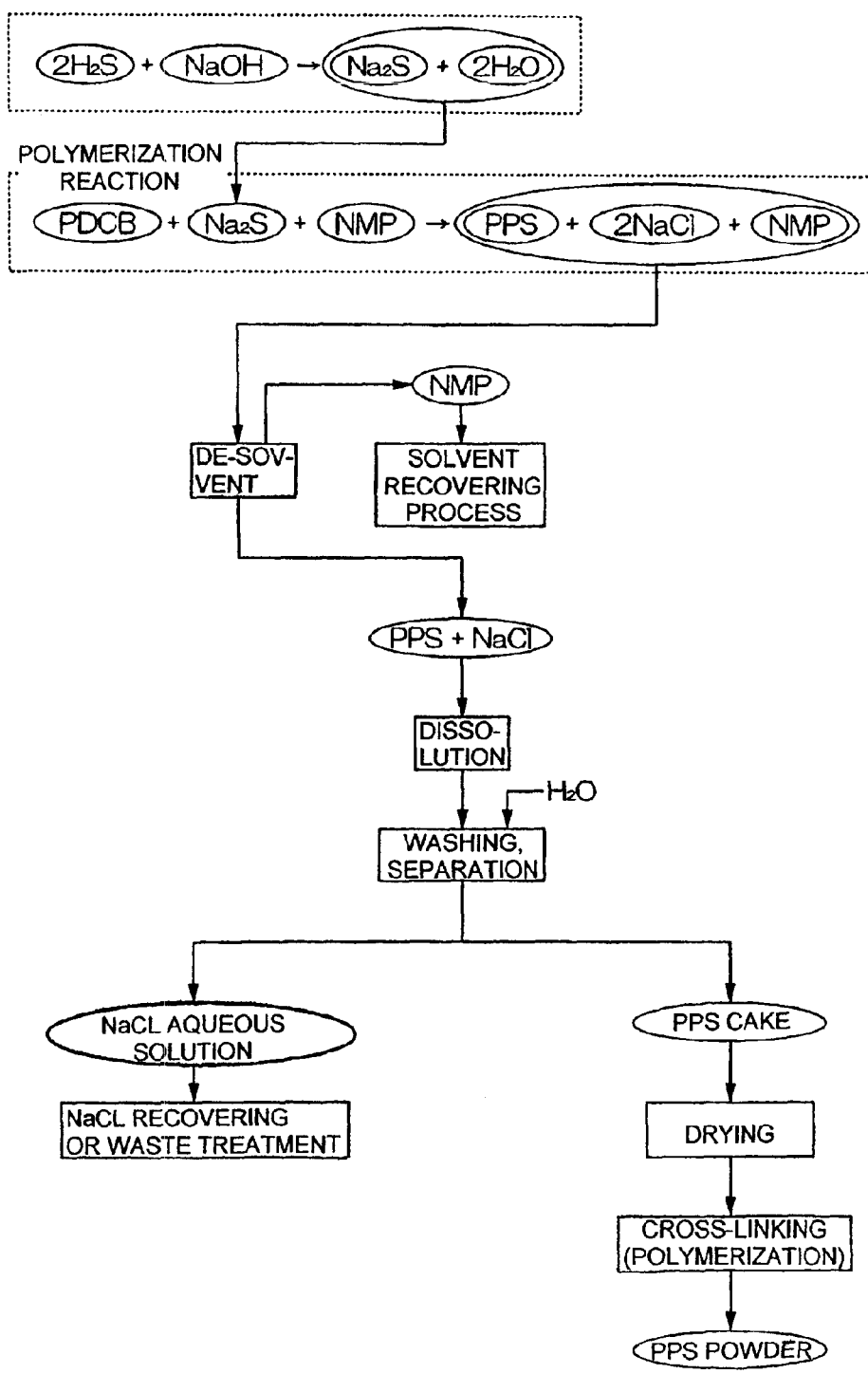
FIG. 2 is a flow diagram of PAS structure.

A flow chart in the case of continuous production of PAS, in this embodiment, continuous production of PPS is shown in FIG. 2.

In producing PPS, a di-halogenated aromatic compound and an alkali metal sulfide are polymerized in an aprotic organic solvent.

Here, as the aprotic organic solvent, aprotic polar organic compounds such as amide compounds, lactam compounds, urea compounds, organic sulfur compounds, cyclic organophosphorus compounds and the like can be used as a single solvent or a mixed solvent, further, can be used in admixture with other solvents.

As the amide compounds, for example, N,N-dimethylformamide, N,N-diethylformamide, N,N-dimethylacetamide, N,N-diethylacetamide, N,N-dipropylacetamide, N,N-dimethylbenzoic amide and the like can be used.

As the lactam compound, for example, N-alkylcaprolactams such as caprolactam, N-methylcaprolactam, N-ethylcaprolactam, N-isopropylcaprolactam, N-isobutylcaprolactam, N-n-propylcaprolactam, N-n-butylcaprolactam, N-cyclohexylcaprolactam and the like, N-methyl-2-pyrrolidone (NMP), N-ethyl-2-pyrrolidone, N-isopropyl-2-pyrrolidone, N-isobutyl-2-pyrrolidone, N-n-propyl-2-pyrrolidone, N-n-butyl-2-pyrrolidone, N-cyclohexyl-2-pyrrolidone, N-methyl-3-methyl-2-pyrrolidone, N-ethyl-3-methyl-2-pyrrolidone, N-methyl-3,4,5-trimethyl-2-pyrrolidone, N-methyl-2-piperidone, N-ethyl-2-piperidone, N-isopropyl-2-piperidone, N-methyl-6-methyl-2-piperidone, N-methyl-3-ethyl-2-piperidone and the like can be used.

As the urea compound, for example, tetramethylurea, N,N-dimethylethyleneurea, N,N-dimethylpropyleneurea and the like can be used.

As the sulfur compound, for example, dimethyl sulfoxide diethyl sulfoxide, diphenylsulfone, 1-methyl-1-oxosulfolane, 1-ethyl-1-oxosulfolane, 1-phenyl-1-oxosulfolane and the like can be used.

As the cyclic organophosphorus compound, for example, 1-methyl-1-oxophospholane, 1-n-propyl-1-oxophospholane, 1-phenyl-1-oxophosphlane and the like can be used.

Of various aprotic organic solvents, N-alkylcaprolactam and N-alkylpyrrolidone are suitable, and N-methyl-2-pyrrolidone (NMP) is particularly preferable. In this embodiment, NMP is used.

The di-halogenated aromatic compound to be polymerized with an alkali metal sulfide is not particularly restricted, and it is preferable to use those containing p-dichlorobenzene (PDCB) in an amount of 50 mol % or more. In this embodiment, PDCB is used.

The projection amount of a di-halogenated aromatic compound is controlled so that the ratio of di-halogenated aromatic compound/sulfur present in the system is preferably from 0.9 to 1.5 (molar ratio), particularly preferably from 0.95 to 1.2.

The alkali metal sulfide to be polymerized with a di-halogenated aromatic compound can be obtained by reacting a sulfur compound with an alkali metal hydroxide. The kind of the sulfur compound is not particularly restricted, and it is preferably to use hydrogen sulfide. In this embodiment, hydrogen sulfide is used. Also, the kind of the alkali metal hydroxide is not particularly restricted. For example, sodium hydroxide, potassium hydroxide and the like can be used. It is preferable to use sodium hydroxide. In this embodiment, sodium hydroxide is used. Therefore, in this embodiment, sodium sulfide is obtained by reacting hydrogen sulfide and sodium hydroxide, and this sodium sulfide is used as the alkali metal sulfide.

As a reaction vessel in which a di-halogenated aromatic compound and a sulfur compound are subjected to a polymerization reaction, for example, a 1 liter stainless autoclave (equipped with a paddle blade as a stirring blade, rotation: 300 to 700 rpm) is mentioned. The polymerization temperature is preferably from 220 to 260° C., and the polymerization time is preferably from 1 to 6 hours.

In this embodiment, the reaction liquid is dehydrated in a distillation tower, and the water content in the polymerization reaction system is regulated, in this process (accompanying polymerization reaction). This dehydration is preferably conducted so that the water content is about from 0.3 to 5 mol per mol of an alkali metal sulfide. A method of collecting a di-halogenated aromatic compound in a gas discharged in this operation will be described later.

The post treatment of the polymerization reaction can be conducted by a known method. For example, as shown in FIG. 2, reaction liquid is cooled, then, subjected to centrifugal separation, filtration and the like to be separated into PPS and sodium chloride, and a solvent (NMP), and the separated solvent is subjected to a solvent recovering process to give recyclable condition. On the other hand, PPS and sodium chloride are dissolved, and subjected to, for example, so-called melt washing with an organic solvent, water and the like. The aqueous solution of sodium chloride generated by this melt washing is subjected to waste water treatment, or sodium chloride is recovered to be subjected to recycling. On the other hand, the melt-washed PPS cake is dried, then, aged to be polymerized, giving a PPS powder.

<Recovering Apparatus>

Next, particularly, a facility example of collecting a di-halogenated aromatic compound in a gas discharged accompanying dehydration treatment, in production of a polyarylene sulfide resin of polymerizing a di-halogenated aromatic compound and an alkali metal sulfide in an aprotic organic solvent, will be described as a facility example embodying the present invention.

Figure 3:
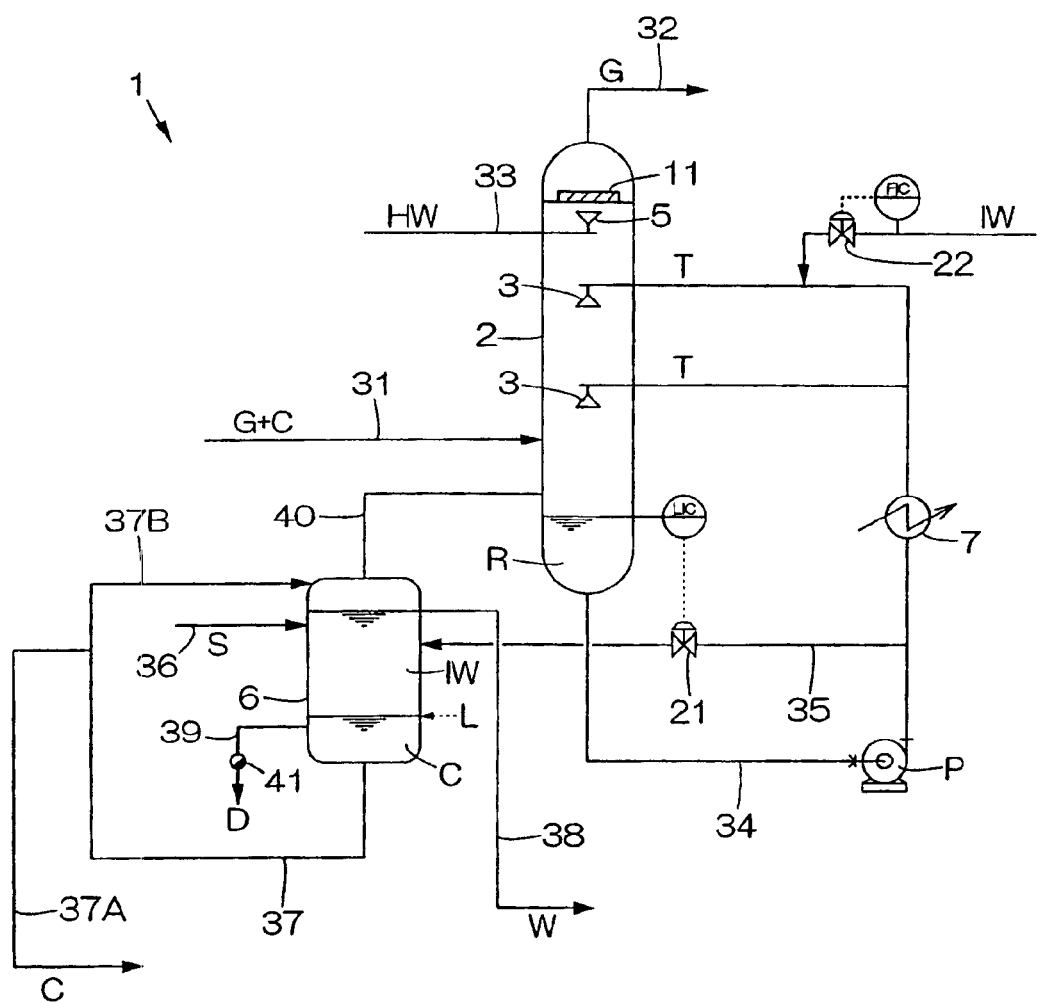
FIG. 3 is a constitution view of a collecting facility of the present embodiment.

FIG. 3 shows a collecting facility 1 of this embodiment.

In this collecting facility 1, first, a gas G into which a di-halogenated aromatic compound C is mixed is allowed to pass through a feeding tube 31 and fed into a collecting tower 2. The collected gas G passes through in the collecting tower 2 toward upper direction. To this flowing through gas G, treating liquid T is projected from a treating liquid projecting means 3 such as a spray nozzle and the like. The treating liquid T is controlled to have temperatures not higher than the melting point of the di-halogenated aromatic compound C. Therefore, by contact with the treating liquid T, the di-halogenated aromatic compound C in the gas G solidifies. The solidified di-halogenated aromatic compound C forms a slurry R with the treating liquid T, and is temporarily stored at the bottom of the collecting tower 2.

As the treating liquid T, for example, a refrigerant IW such as water and the like can be used. In this embodiment, a slurry R is used which is recycled through a recycling tuber 34 and of which concentration is regulated with the refrigerant IW. This recycling form will be described later.

In this embodiment, two treating liquid projecting means 3 are provided along the flow through direction of the gas G, however, the form is not limited to this. For example, one means can be provided, or three, four or more means can be provided, along the flow through direction. Two or more treating liquid projecting means 3 can also be provided at the same position regarding the flow through direction, namely, can be provided in parallel. This can be appropriately modified so that solidification of the di-halogenated aromatic compound C can be conducted securely.

In this embodiment, the treating liquid T is projected from upper direction to lower direction to the gas G containing the di-halogenated aromatic compound C flowing through from the lower direction to upper direction, however, the constitution is not limited to this. For example, the treating liquid T can be projected from upper direction to lower direction to the liquid G containing the di-halogenated aromatic compound C flowing through toward side direction. Embodiments are permissible in which the di-halogenated aromatic compound C in the gas G is solidified to form a slurry R with the treating liquid T.

On the other hand, the gas G from which the di-halogenated aromatic compound C has been removed is subjected to removal of mist by an eliminator 11, and discharged through a discharge tube 32. To the eliminator 11, a hot medium HW such as hot water and the like is sprayed from a spray nozzle 5 through a feeding tube 33. By this, the di-halogenated aromatic compound C adhered to the eliminator 11 is melt-removed, preventing clogging.

The slurry R stored at the bottom of the collecting tower 2 is extracted through a recycling tube 34 connected to the bottom of the collecting tower 2, and carried to a separation tank 6 described later through a branching tube 35 branching at the middle of the recycling tube 34. In the middle of the branching tube 35, a gate valve 21 is provided, and by opening and closing of this gate valve 21, the extraction amount to the separation tank 6 is regulated. The gate valve is designed so that it is opened corresponding to the liquid surface of the slurry R, namely, only when the liquid surface rises from given position.

The slurry R not extracted to the separation tank 6 is cooled by a cooling apparatus 7 provided at the middle of the recycling tube 34, then, projected as the treating liquid T to the gas G from the treating liquid projecting means 3 as it is through the recycling tube 34.

To the slurry R projected as the treating liquid T, a refrigerant IW is mixed in the middle of the recycling tube 34 for regulation of its concentration. By this, projection from the treating liquid projecting means 3 is conducted smoothly. The mixing amount of the refrigerant IW is controlled by the gate valve 22. The above-mentioned recycling of the slurry R is performed by a recycling pump P equipped in the middle of the recycling tube 34.

As described above, in this embodiment, a part of the slurry R was recycled and utilized as the treating liquid T.

However, it is also possible that all of the slurry R is extracted, and the treating liquid T is composed solely of the refrigerant IW. However, this embodiment is more efficient since the amount of the refrigerant IW may be small.

The slurry R fed to the separation tank 6 is heated by steam S fed through a feeding tube 36. By this, the di-halogenated aromatic compound C solidified present in the slurry R is melted to be liquid. A condensate D (steam drain) is recovered in a drain tank not shown through a drain tube 39 having a drain trap 41 in the middle of this.

The di-halogenated aromatic compound C is, when turns to be liquid, two-phase-separated from the refrigerant IW owing to a difference in specific gravity. In this embodiment, since cooling water are used as the refrigerant IW, the di-halogenated aromatic compound C precipitates to the bottom of the separation tank 6.

The di-halogenated aromatic compound C precipitates to the bottom of the separation tank 6 is extracted from the separation tank 6 by an extraction tube 37. The extraction tube 37 is branched on the way into a branching tube 37A and a branching tube 37B for balance, and the branching tube 37B for balance is connected to the top of the separation tank 6. By the extraction tube 37, a part of the di-halogenated aromatic compound C extracted from the separation tank 6 is discharged out of the system through the branching tube 37A. The remainder is discharged by branching tube 37B for balance to maintain the C liquid level L in the separation tank 6. Namely, judging from the position of the interface L with the di-halogenated aromatic compound C, namely, when the interface L is higher than the given position, the di-halogenated aromatic compound C discharged out of the system, and when the interface L is lower than the given position, the di-halogenated aromatic compound C is not extracted.

A discharge tube 38 for refrigerant IW is connected to an upper side portion of the separation tank 6. When the liquid surface of the refrigerant IW is higher than the given position, the refrigerant IW is discharged out of the system as a waste W through a discharge tube 38. 40 in the figure means a communication tube communicating the separation tank 6 and the collecting tower 2.

<Effect of the Invention>

As described above, according to the present invention, a facility of collecting a component of high melting point in a gas, excellent in treating efficiency and having a relatively simple structure, or a facility of collecting a di-halogenated aromatic compound in a gas, is provided.

What is claimed is:

1. A facility for collecting a component having higher melting point as compared with other constituent components in a gas, comprising:

a collecting tower through which the gas passes, a treating liquid projecting means for projecting treating liquid having temperature controlled to not higher than the melting point of the high melting point component, to the gas in said collecting tower, an extracting means for extracting from inside of the collecting tower a slurry composed of the treating liquid and the high melting point component solidified by contact with the treating liquid, a separation tank in which the slurry extracted from inside of the collecting tower is stored, a melting means of melting the high melting point component solidified in the slurry, and wherein the high melting point component is recovered utilizing a difference in specific gravity of the melted high melting point component and the treating liquid.

* * * * *